United States Patent [19]

Bloom

[11] 4,133,775
[45] Jan. 9, 1979

[54] DICHROIC LIGHT POLARIZERS STAINED WITH METAL CHELATES

[75] Inventor: Stanley M. Bloom, Waban, Mass.

[73] Assignee: Polaroid Corporation, Cambridge, Mass.

[21] Appl. No.: 765,642

[22] Filed: Feb. 4, 1977

Related U.S. Application Data

[63] Continuation-in-part of Ser. No. 641,936, Dec. 18, 1975, abandoned, which is a continuation-in-part of Ser. No. 474,042, May 28, 1974, abandoned.

[51] Int. Cl.$^2$ ............................................. G02B 5/30
[52] U.S. Cl. ..................................... 252/300; 264/2; 350/154; 350/311
[58] Field of Search ............... 252/300; 350/1, 2, 147, 350/311, 154; 351/49; 260/242; 264/2

[56] References Cited

U.S. PATENT DOCUMENTS

| | | | |
|---|---|---|---|
| 2,454,515 | 11/1948 | Land | 264/2 |
| 2,505,085 | 4/1950 | Amon, Jr. et al. | 260/41 C |
| 2,554,850 | 5/1951 | Binda | 350/154 |
| 3,588,216 | 6/1971 | Bloom | 252/300 |
| 3,687,862 | 8/1972 | Bloom | 252/300 |
| 3,724,934 | 4/1973 | Bloom | 252/300 |
| 3,875,199 | 4/1975 | Bloom | 252/300 |

FOREIGN PATENT DOCUMENTS

34-7241 10/1959 Japan.

Primary Examiner—Benjamin R. Padgett
Assistant Examiner—Deborah L. Kyle
Attorney, Agent, or Firm—Esther A. Hopkins

[57] ABSTRACT

Novel dichroic light polarizers and methods for preparing them are disclosed. These polarizers are stained with metal chelates having a repeating structural formula selected from

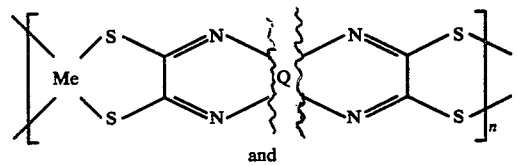

and

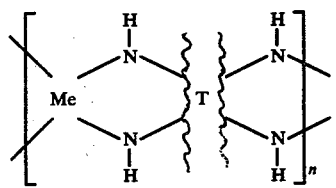

wherein Me represents a metal of the first, second or third transition metal series, Q and T are bridging groups and n is a whole number between 2–10, inclusive.

30 Claims, 1 Drawing Figure

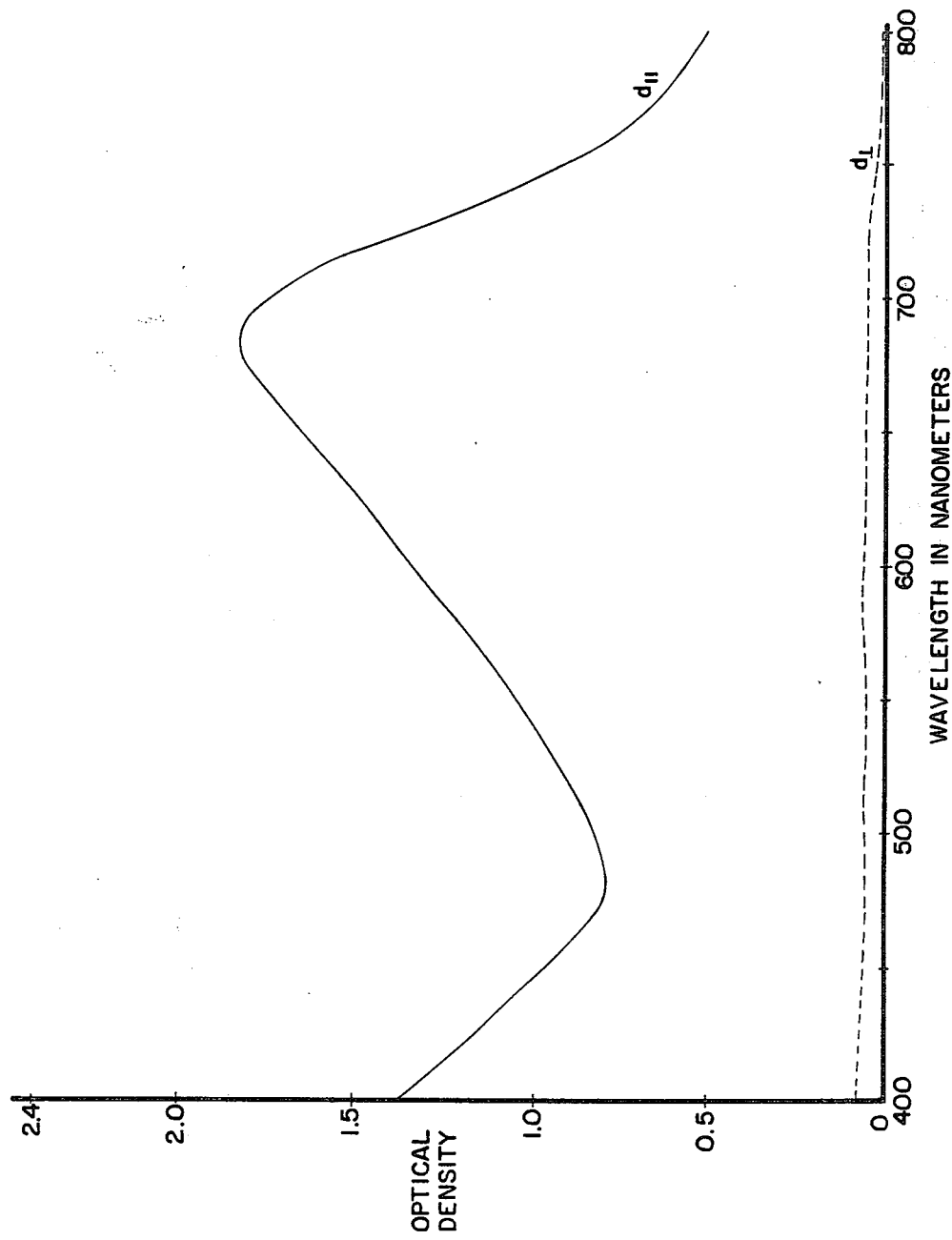

DICHROIC LIGHT POLARIZERS STAINED WITH METAL CHELATES

This application is a continuation-in-part of application Ser. No. 641,936, filed Dec. 18, 1975 now abandoned which is a continuation-in-part of application Ser. No. 474,042, filed May 28, 1974 now abandoned.

The present invention relates to new and improved dichroic light polarizers and to processes for preparing them. More specifically, this invention relates to dichroic light polarizers comprised of molecularly oriented polymers stained with transition metal chelates and to processes for preparing them.

The most common dichroic light polarizers in use today are sheets of transparent plastic material which have been treated to exhibit dichroism when molecular chains are aligned with their optic axes parallel to one another. Thus the component of an incident light beam vibrating in a direction orthogonal to their alignment is absorbed while the other component is transmitted. One object of the present invention is to provide new dichroic light polarizers which are capable of polarizing light of many different wavelengths while exhibiting good stability to heat and light. Another object is to provide novel light polarizers rendered dichroic by metal chelate stains. A further object is to provide novel metal chelates useful in forming said polarizers. A still further object is to provide novel processes for preparing polarizers stained with said metal chelates. Other objects, features and advantages of this invention will be obvious or will appear hereinafter.

The invention accordingly comprises the several steps and the relation and order of one or more of such steps with respect to each of the others and the product possessing the features, properties and the relation of elements which are exemplified in the following detailed descriptions, and the scope of the application of which will be indicated in the claims.

For a fuller understanding of the invention, reference should be made to the accompanying Figure which is a graph of optical density plotted against wavelength in nanometers for the two components, d∥ and d⊥, of a 100% linearly polarized light beam transmitted by a polarizer of the present invention, wherein d∥ is the optical density of the sample when the stretch direction of the molecularly oriented transparent linear polymer is parallel to the electric vector of the incident polarized light and d⊥ is the optical density of the sample when the stretch direction is perpendicular to the electric vector. This polarizer comprised molecularly oriented polyvinyl alcohol stained with nickel and manganese chelates of 2,3,7,8-tetramercaptopyrazino[2,3-g]quinoxaline.

One of the most widely used polarizers today is H-sheet. It comprises a transparent sheet of polyvinyl alcohol stretched unidirectionally to orient the polymeric molecules and stained with an iodine ink to render said sheet dichroic. That component of a light beam whose electric vibrations run parallel to the stained and oriented molecules is absorbed while the other component vibrating perpendicular to the molecules passes through with very little absorption.

The dichroic performance of H-sheet is stable over a reasonably wide temperature range, but its performance is affected by high temperatures since the iodine stain is desorbed at temperatures of 175° F. and above. Other staining material more resistant to such high temperatures have thus been proposed and patented. These include both polymeric and nonpolymeric metal chelates. For example, nonpolymeric nickel and copper chelates of dithiooxamide are disclosed in U.S. Pat. No. 2,505,085 issued to W. R. Amon and M. W. Kane, while polymeric nickel, copper and cadmium chelates of 2,5-dihydroxy-p-quinone are shown in Japanese Pat. No. 7241/59 issued to Y. Saito and S. Kanda.

It has now been found that dichroic light polarizers may be prepared which comprise a sheet of molecularly oriented, transparent polymer stained with an oligomeric metal chelate having a repeating structural formula selected from

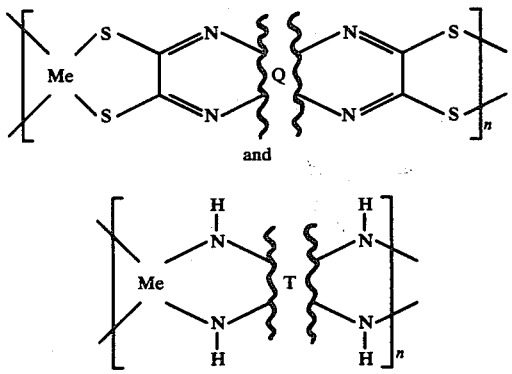

and wherein Me is a metal of the first, second or third transition metal series; Q and T are bridging groups and n is a whole number between 2–10, inclusive.

As used herein, "Oligomers" are polymers which comprise not more than ten repeating units, and "oligomeric" refers to such polymers. In addition, Me in each repeating unit of the above chain may be the same, or different first, second or third transition metals. Accordingly, for purposes of the present invention, the term "repeating unit" applies to units of the oligomers even though the "Me" metals may differ.

The chelates of the present invention are linear oligomeric chains containing at least two repeating structural units as given above, in which the transition metals are joined together by functional atoms or groups of atoms at each end of the intervening ligands. The joining ends of each ligand have at least one, and preferably two, functional atom(s) which coordinate with an adjoining transition metal, or Me above, to form linear oligomers which are used to stain the polymeric chains of a polarizer sheet. Q and T are designated as bridging groups and may be any array allowing the molecule to metal chelate at both ends. They include, for example, such structures as

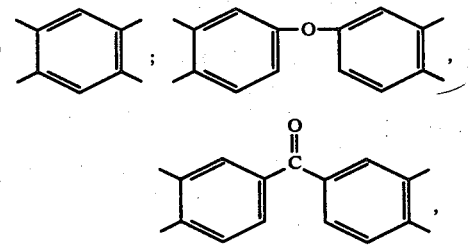

-continued

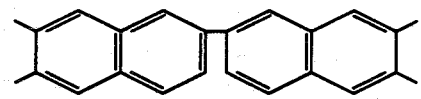

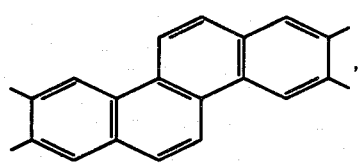

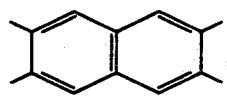

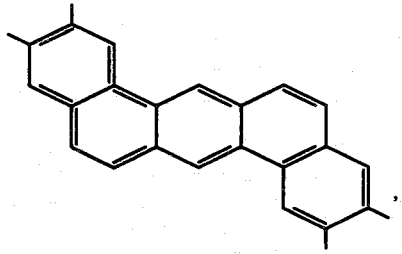

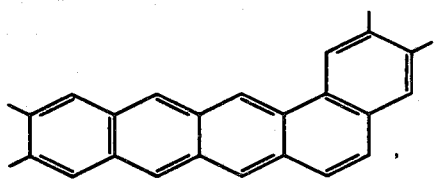

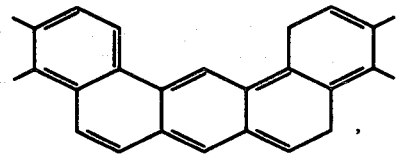

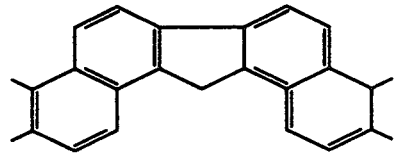

and

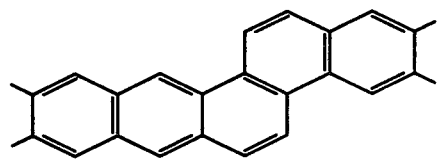

The bridging structures include homocyclic aromatic rings, heterocyclic aromatic rings, fused rings, rigidly connected rings and rigidly connected fused rings. They do not have active pendant substituent groups.

The nonchelated ends of the molecules have associated with them any other molecule or ion available in the system, as for example, water molecules or any free anion associated with the remaining cation.

Preferred metal ions are divalent nickel, manganese, copper, cobalt and zinc ions and trivalent iron and chromium ions. Especially good light polarizers are obtained by the use of mixtures of such metal ions, particularly divalent nickel and manganese ions, which produce oligomers with different "Me" metals in the chain. In such mixtures the ratio of respective metal ions may be varied over a wide range. The concentration of the oligomeric metal chelates, whether used individually or in mixture, may be varied over a wide range and the particular concentration providing the highest dichroic ratio for a particular polarizing system (degree of stretch and orientation polymer) may be readily determined by routine experimentation.

The resultant polarizers exhibit excellent heat stability. Furthermore, unlike the Saito and Kanda dihydroxyquinone chelate stained polarizers whose dichroic behavior is essentially limited to the ultraviolent region, the polarizers of this invention can also absorb light in both the visible and infrared regions. In the preferred embodiments of the present invention, polarizers with dichroic ratios of at least 10 between wavelengths of 300 to 900 have been prepared.

The oligomeric metal chelates utilized in the practice of the present invention are similar to but readily distinguishable from the transition metal chelates described in my U.S. Pat. Nos. 3,588,216, 3,687,862 and 3,724,934. The transition metal chelates described and utilized in said patents are characterized as containing only one unit of the formula:

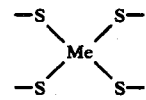

wherein Me is a metal, e.g., nickel. In addition to this distinction, the light polarizing properties are not imparted by the transition metal chelate (which imparts infrared absorption to the light polarizer) but by conventional light polarizing media, e.g., iodine stained molecularly oriented polyvinyl alcohol (H-sheet above). In the light polarizers of the present invention, the light polarizing properties are solely the result of the oligomeric metal chelate(s). It will be understood, however, that it is within the scope of the present invention to utilize ligands similar to those described in the above mentioned Bloom patents, provided such ligands have been modified to include tetra-substitution of the ligand so that upon chelation chain length propagation will occur and thereby provide the desired oligomer.

The oligomeric metal chelates employed in the practice of this invention may be incorporated in an appropriate polymeric plastic carrier by various procedures familiar to those skilled in the art. In a preferred method these chelates are formed in situ in their carrier material, and the resultant mixture is cast and stretched to produce the desired polarizer. For example, a solution containing the chelate ligand and a carrier material such as polyvinyl alcohol may be combined with a solution containing more of the carrier material as well as one or more salt(s) of the chelate metal(s). The resultant solution is then heated, cast and stretched. As taught in U.S. Reissue Patent No. 23,297, issued to M. Hyman, Jr. and C. D. West, the stretched sheet may be treated with a boric acid solution for additional heat and moisture resistance.

The following examples are given to further illustrate the formation of the dichroic polarizers of this invention, as well as the ligands and metal chelates prepared from them which are utilized in forming said polarizers. These examples are not intended to limit the invention's scope.

EXAMPLE 1

The procedure described below was followed in preparing a dichroic polarizer comprised of polyvinyl alcohol, hereinafter referred to as PVA, stained with mixed nickel and manganese chelates of the novel ligand compound 2,3,7,8-tetramercaptopyrazino[2,3-g]quinoxaline, hereinafter referred to as TMPQ, having the formula:

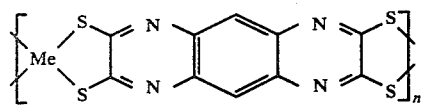

wherein Me is nickel in some repeating units, and manganese in other repeating units of the oligomeric chains; and n is a whole number between 2 and 10, inclusive.

The following solutions were prepared:
(a) 10% nickelous acetate solution: 10 g. of $Ni(C_2H_3O_2)_2 \cdot 4H_2O$ were dissolved in 90 ml. of distilled water to obtain a green solution.
(b) 10% manganous acetate solution: 10 g. of $Mn(C_2H_3O_2)_2 \cdot 4H_2O$ were dissolved in 90 ml. of distilled water to obtain a colorless solution.
(c) 10% PVA stock solution: 80 g. of C-20 grade polyvinyl alcohol were mixed with 720 ml. of distilled water. After a swelling time of 1 hr., the mixture was heated on a steam bath for an additional hour with frequent swirling and then filtered while hot to yield a clear, colorless solution.
(d) 0.3% TMPQ in 10% $NH_3$ (aq.) solution: 30 ml. of 10% aqueous ammonia were added to 90 mg. of TMPQ. The mixture was warmed gently on a steam bath and swirled vigorously to facilitate dissolution. After 2 min. of gentle heating (40° C. max.), the red-orange solution was filtered to remove a negligible amount of insoluble material. This material was rinsed with 1 ml. of hot water containing a few drops of concentrated $NH_4OH$ and added to the clear, red-orange filtrate which was sealed from the air. [For best results, the solution should be used as soon as possible in preparing solution (e) below.]
(e) 0.075% TMPQ in 7.5% PVA-2.5% $NH_3$: 75 ml. of 10% PVA stock solution was heated for 5 min. on a steam bath to reduce its viscosity. The solution was removed from the bath and 25 ml. of freshly prepared solution (d) were blended in to produce a dark red solution with an orange cast which was heated gently for 2 min. and sealed from the air.
(f) 0.02% $Ni^{+2}$ and $Mn^{+2}$ ions in 10% PVA solution: 0.1 ml. of solution (a), 0.1 ml. of solution (b) and 45 ml. of solution (c) were stirred together. The viscous solution was heated on a steam bath for 15 min. and then used immediately in preparing solution (g).
(g) 0.019% TMPQ, 0.625% $NH_3$, 9.4% PVA Solution containing 1 equivalent each of $Ni^{+2}$ and $Mn^{+2}$ ions for each equivalent of TMPQ: After solutions (e) and (f) had been heated, they were mixed by pouring solution (f) into solution (e) with vigorous stirring. The resultant dark solution was stirred and heated for a final 5 min. on the steam bath and then cast while still hot to produce a 0.04 in. thick film. After the film was air dried, a homogeneous section was cut out and stretched to about 4 times its original cast length or 6 times its axial elongation. It was then immersed in saturated, aqeuous boric acid solution for 30 sec., blotted and air dried to yield a dichroic light polarizing sheet.

EXAMPLE 2

A green polarizer having oligomeric metal chelates of nickel and manganese was prepared from formulations containing 0.02 weight % $Ni^{+2}Mn^{+2}$/TMPQ chelate, 9.4% PVA and 0.625% $NH_3$ in a manner similar to that described in Example 1, the borated cast sample being stretched unidirectionally about 9 to 10 times. The optical transmission waves of the two components of a light beam transmitted by this light polarizer are reproduced in the accompanying Figure. As shown therein, dichroic ratios of at least 16 were obtained between 400 and 800 m$\mu$, a dichroic ratio of 36.2 being attained at 685 m$\mu$. The polarizer also exhibited dichroism in the ultraviolet region. A dichroic ratio of at least 10 was obtained between 300 and 400 m$\mu$, a dichroic ratio of 11.3 being attained at 318 m$\mu$.

Other polarizers stained with mixed nickel and manganese chelates of TMPQ formed in situ in polyvinyl alcohol solution prior to being cast and stretched 6 to 7 times include a green polarizer having a dichroic ratio of 20.2 at 700 m$\mu$ and a neutral colored polarizer having a dichroic ratio of 24.9 at 730 m$\mu$. The different color of the last polarizer is probably due to the age of the stock solutions being cast, this polarizer being cast within 1 hour of solution preparation so that there was less chance for ligand oxidation than with the first and second polarizers which were cast two and one days respectively after stock preparation.

Polarizers were also prepared from single metal chelates. Examples of such polarizers are provided below.

EXAMPLE 3

A nickel/TMPQ chelate polarizer of blue/green color was prepared from stock solutions containing the same percentages of components as described in Example 2, the cast sample again being stretched unidirectionally about 9 to 10 times. This polarizer possessed a dichroic ratio of 25.8 at 270 m$\mu$ with a d $\parallel$ of 2.06 and a d$\perp$ of 0.08. In the ultraviolet region a dichroic ratio of 8.7 was attained at 328 m$\mu$.

EXAMPLE 4

A manganese/TMPQ chelate polarizer of orange color was prepared as described in Example 3, $Mn^{+2}$ being substituted for $Ni^{+2}$. This polarizer possessed a dichroic ratio of 15.4 at 500 m$\mu$ with a d $\parallel$ of 2.61 and a d$\perp$ of 0.17. In the ultraviolet region dichroic ratios of 3.3 at 258 m$\mu$ and 3.7 at 289 m$\mu$ were attained.

EXAMPLE 5

Dichroic light polarizers were also prepared from metal chelates of sym-tetraaminobenzene, hereinafter referred to as TAB, and its tetrahydrochloride, hereinafter referred to as TAB.HCl. Solutions of TAB.HCl were mixed with nickel ions to yield magenta colored polarizers, while blue colored polarizers were prepared when ammonia was included in the stock solutions so as to produce TAB as a free base. In the former instance a casting solution containing 9.4% PVA and 0.02% Ni/-TAB.4HCl chelate yielded a polarizer exhibiting a dichroic ratio of 21.3 at 565 mµ with a d ∥ of 0.85 and a d⊥ of 0.04. A similar solution containing 0.07% of the metal chelate yielded a polarizer exhibiting a dichroic ratio of 18.5 at 568 mµ with a d ∥ of 3.14 and a d⊥ of 0.17.

As stated above, polarizers utilizing TAB as the ligand were prepared by adding ammonia to the casting solution. Solutions containing 0.625% NH₃, 9.4% PVA and 0.02 or 0.07% Ni/TAB chelate yielded polarizers exhibiting dichroic ratios at 700 mµ of 7.8, d ∥ being 0.47 and d⊥ being 0.06, for the 0.02% chelate solution and 17.2, d ∥ being 2.93 and d⊥ being 0.17, for the 0.07% chelate solution. When mixed nickel and manganese chelates of TAB were substituted for the nickel at 0.04% chelate concentration, the resultant polarizer exhibited a dichroic ratio of 16.9 at 698 mµ.

Although the best dichroic ratios are achieved in substantially all cases when the stock solutions are cast soon after preparation, preferably within one hour, this is especially important when TAB or its hydrochloride is employed as the chelate ligand. It should also be noted that air oxidation of the cast Ni/TAB.HCl chelate polarizer was necessary to produce its magenta color.

The novel TMPQ ligand utilized in some of the polarizers described in the previous examples was prepared in the following manner:

EXAMPLE 6

Step 1

A 3 liter, 3 neck flask was equipped with stirrer, thermometer and condenser topped with an exhaust tube vented away from the stirring motor (HCl evolved). The flask was supported in a mantle and charged with 100.0 g. of 1,2,4,5-tetraaminobenzene tetrahydrochloride (0.352 mole), 96.4 g. of oxalic acid dihydrate (0.765 mole) and 1 liter of 10% hydrochloric acid. The resulting violet slurry was stirred and heated to reflux (106°–107° C.) over a 1 hour period, then kept at reflux for an additional 3 hours. The hot reaction mixture (purple dispersion) was slowly filtered through a large, coarse sintered glass funnel. After about 800 ml. of dark purple filtrate had been collected, the still quite pasty purple solid was transferred to a 2 liter Erlenmeyer flask and magnetically stirred with one liter of acetone for about 30 minutes. The mixture was again slowly filtered through coarse sintered glass. The solid was "pulled" as dry as possible (nitrogen or air stream may be directed over the top surface of solid to help evaporate some of the acetone toward the end of the filtration). The purple rubbery mass was transferred to a heated vacuum desiccator (water aspirator, HCl evolved) and dried at 80°–90° C. until it could be ground to a powder. Final drying was accomplished (two hours) under vacuum over P₂O₅ at 100°–120° C. to provide 75.1 g. of a brown powder having a purple cast for an 87% yield of 6,9-dihydropyrazino[2,3-g]quinoxaline-2,3,7,8(1H,4H) tetrone,

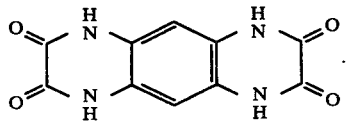

Step 2

A 500 ml., 3 neck flask containing a Teflon coated magnetic stirring bar was purged with nitrogen. 111.8 g. of phosphorous pentachloride (0.537 mole) were weighed out under nitrogen and charged into the reaction flask followed (under nitrogen) by 25.0 g. of the product obtained above (0.102 mole) and 125 ml. of nitrobenzene. The flask was stoppered, removed from the nitrogen atmosphere and transferred to a hood where it was supported in a mantle and equipped with a nitrogen inlet, thermometer and condenser topped with an exhaust tube (HCl evolved). The slurry was gradually heated to 150° C. over a 1 hour period. At 70°–80° C. the purple slurry thinned sufficiently to permit magnetic stirring; it slowly changed to a dark brown solution with a yellow cast during the heating period. Some of the excess PCl₅ sublimed into the condenser and, at a pot temperature of about 130°–140° C., phosphorous oxychloride began to reflux. Heating was discontinued and the solution allowed to cool to about 60° C. Inert gas flow was halted, and the flask was equipped for reduced pressure distillation. Aspiration was applied as the solution was stirred and again heated gently. The receiver was packed in ice, and phosphorous oxychloride was collected (90°–110° C. pot temperature, 70°–85° head temperature). Distillation was continued until yellow nitrobenzene began to collect in the receiver (110°–120° pot temperature, 96°–110° head temperature). About 80 g. of distillate were collected. The pot residue was cooled to room temperature and filtered through a coarse sintered glass funnel. After the bulk of the nitrobenzene had been removed, residual sludge in the reaction flask was transferred to the funnel with the aid of 250 ml. of hexane. The collected solid was suspended in, and stirred with, 250 ml. of fresh hexane, recollected by filtration and washed down with additional hexane. After heated vacuum desiccation there was obtained 19.8 g. of a fluffy brown solid with a yellow cast, melting in the range of 316°–317° C. (begins to sublime about 290° C.), for a 61% crude yield of 2,3,7,8-tetrachloropyrazino[2,3-g]quinoxaline,

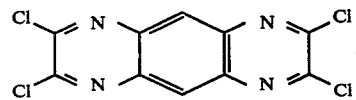

[In repeat runs, a 67% crude yield was obtained on another 0.10 mole scale, while on a 0.20 mole scale a 72% crude yield was obtained.]

Since the tetramercapto analog of the product obtained above is extremely difficult to purify, product purification at this stage of the reaction sequence is preferred. The following procedure is preferred for the purity of product, although it results in substantial yield reduction.

Soxhlet extraction, vacuum sublimation and repeated recrystallizations from benzene were all investigated as possible purification methods. The product derived from both the extraction and sublimation methods tended to be contaminated with brown impurities which were removed by subsequent recrystallization from benzene. Although substantial product loss occurred during carbon treatment, such treatment did afford a pure product and is preferred. The crude product may be directly recrystallized from benzene or, preferably, sublimed once and then recrystallized from benzene. The following recrystallization procedure is typical of those utilized in purifying the product.

The 19.8 g. of crude brown product obtained above was sublimed batch-wise using a large capacity sublimer (Kontes 855700, ~0.3mm, bath temperature about 220°-240° C.). The various batches of sublimate were combined to yield 15.8 g. of yellow solid contaminated with brown material. This was boiled with 1900 ml. of benzene. The supernate was decanted from 4.5 g. insolubles, treated with carbon and filtered (hot) through Celite on sintered glass (the suction tubing was clamped off after the initial vacuum was established). The funnel content was rinsed down with 150 ml. of boiling benzene. The filtrate was reheated and allowed to cool slowly. A first crop of bright yellow needles weighing 4.6 g. was collected after several hours at room temperature; a second crop of 1.2 g. was obtained by concentrating the mother liquor to 1200 ml. and a third crop of 0.7 g. from further concentration to 350 ml. for a total yield of 6.5 g. All three crops provided clear, yellow melts free of amber or brown tint which melted sharply at, or near, 330° C. for a 20% yield of purified product.

Step 3

A 500 ml., 3 neck flask equipped with a Teflon coated magnetic stirring bar (since the product is a powerful chelating agent, no metal should be allowed to contact mixture) and supported in a mantle was charged with 2.30 g. (0.0072 mole) of the purified product obtained above, 4.38 g. (0.0576 mole) of alcohol soluble thiourea and 125 ml. of absolute ethanol. The thin, light yellow slurry was stirred and heated to reflux (~ 79° C.) under nitrogen. Reflux was continued for 2 hours, during which time the mixture became dark red-brown. After cooling, the mixture was transferred to a 1 liter flask (additional ethanol was used to complete transfer), and evaporated to dryness under reduced pressure. The red-violet solid residue (tetraisothiouronium salt) was dissolved easily in dilute sodium hydroxide (12.5 g NaOH in 125 ml. distilled H₂O) and the solution returned to the 500 ml. reaction flask and placed under a vigorous nitrogen purge. The red-orange solution was magnetically stirred and heated to reflux under nitrogen for 30 minutes. It darkened during reflux but remained red to transmitted light and orange to reflected light. The mantle was removed and acidification with acetic acid was carried out while the solution was still hot (to obtain a more filterable precipitate). 20 ml. of glacial acetic acid was charged into a dropping funnel and added dropwise with stirring (still under nitrogen) to the hot (~ 85° C.), basic, red-orange solution. The acidification required 25 minutes. When about 15 ml. (¾) of the acid charge had been added the now dark purple mixture (containing the precipitate) foamed and expanded as a sulfur-containing volatile (having a strong smell and blackening lead acetate paper) was suddenly evolved. Further acid addition was temporarily halted until gas evolution subsided (~ 2 min.). The remaining acid was added without difficulty (final pH of mixture 4–5, hydrion). The mixture was allowed to cool to room temperature, slowly filtered through a medium porosity sintered glass funnel under nitrogen and washed down with 30 ml. of distilled water. The collected solid (still pasty) was redissolved in dilute sodium hydroxide (12.5 g. NaOH in 125 ml. H₂O). The mixture was stirred under nitrogen to effect solution (a few minutes at room temperature), and filtered through Celite to remove a few mgs. of dark solid. The clear, deep orange filtrate was magnetically stirred and heated (under nitrogen) to 50° C. to minimize coprecipitation of the sodium mercaptide during subsequent acidification. Glacial acetic acid (20 ml.) was added dropwise over 5 minutes to provide a dark purple precipitate (no gas evolution occurred during this reprecipitation procedure). The precipitate was filtered (nitrogen tent) with difficulty (slow), and washed down with 50 ml. of water. The still somewhat pasty solid was vacuum dried (still on the funnel) at 110° for 2 hours to yield 2.32 g. of once reprecipitated dark solid having a green-gold luster. The 99% crude yield of solid was triturated with 50 ml. of distilled water, recollected and redried to give 2.16 g. of solid for a 92% yield of the novel compound 2,3,7,8-tetramercaptopyrazino[2,3-g] quinoxaline or TMPQ,

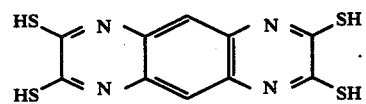

Elemental analysis indicated the product still contained sodium acetate (1.08% ash) and a trace of chloride (0.25%). [This step was repeated on a 0.0125 mole scale with an 83% crude yield.] The solid product was used directly for the preparation of oligomeric metal chelates which gave good dichroic light polarizers in accordance with this invention.

Although polyvinyl alcohol served as the carrier material in the foregoing examples, other transparent and orientable linear polymers are disclosed in U.S. Reissue Pat. No. 23,297 issued to M. Hyman, Jr. and C. D. West and U.S. Pat. No. 2,453,186 issued to F. J. Binda; 2,454,515 issued to E. H. Land; 2,505,085 issued to W. F. Amon, Jr. and M. W. Kane and 2,554,850 issued to F. J. Binda. In addition to the aforementioned TMPQ and TAB ligands other ligand materials found useful in preparing metal chelate dichroic polarizers in accordance with this invention include piperazine dithiocarbamate,

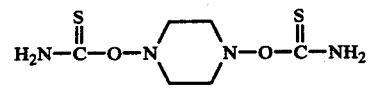

3,3'-diaminobenzidene,

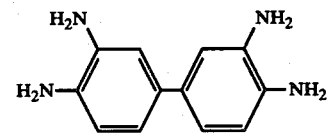

3,3'4,4'-tetraaminobenzophenone,

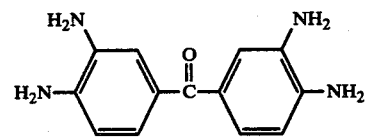

and 3,3'4,4'-tetraaminodiphenylether.

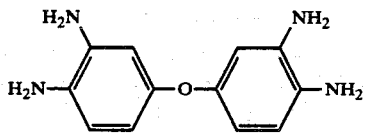

The dichroic polarizers of the invention may be made by several different methods. As described in the above examples, one method involves mixing together solutions containing the transparent, linear polymeric carrier and the metal and ligand components of the oligomeric metal chelate, casting and then stretching the case sheet to orient the polymeric carrier molecules. Although this method of preparation is preferred, other methods may of course be employed. For example, the carrier sheet may be cast and oriented before being stained or the cast sheet may be stained and then oriented. As shown in Example 7 below, the preferred method just described generally yields the highest dichroic ratios.

EXAMPLE 7

Dichroic light polarizers containing various transition metal oligomeric chelates were prepared by at least one of the following methods: in Method 1, solutions of polyvinyl alcohol, transition metal(s) and TMPQ were mixed together, cast in sheet form and then stretched to orient the polarizer molecules; polarizers prepared in accordance with Method 2 were made from a cast sheet of polyvinyl alcohol which was stretched and subsequently stained with metal chelate by dipping the sheet in a solution containing TMPQ and then in a metal salt solution; polarizers prepared by Method 3 were obtained by casting, staining as in Method 2 and then stretching the polarizer sheet. Dichroic ratios at the wavelength of maximum absorption of each of the resultant polarizers were:

| Metal Ion(s) | Method 1 | Method 2 | Method 3 |
| --- | --- | --- | --- |
| $Ni^{+2}$ | 16.2 | 3.8 | 3.7 |
| $Mn^{+2}$ | 14.3 | 7.4 | 11.6 |
| $Cu^{+2}$ | 5.9 | 5.8 | 3.4 |
| $Co^{+2}$ | 2.1 | 4.7 | 3.3 |
| $Zn^{+2}$ | | 3.6 | |
| $Fe^{+3}$ | | 3.5 | |
| $Cr^{+3}$ | | 3.4 | |
| $Cd^{+2}$ | | 1.9 | |
| $Pd^{+2}$ | | 1.3 | |
| $Ni^{+2}/Mn^{+2}$ | 20.0 | | |
| $Ni^{+2}/Cu^{+2}$ | 10.2 | | |
| $Ni^{+2}/Co^{+2}$ | 11.3 | | |
| $Ni^{+2}/Cu^{+2}$ | 7.7 | | |

The results in this example are believed to reflect differences in the length of the oligomer and in the concentration of the oligomeric metal chelate incorporated in the light polarizer, this concentration generally being lower when either Method 2 or 3 is employed than with Method 1 is used. In addition, Method 1 provides a more uniformly controllable concentration of oligomeric metal chelate in the light polarizer, both with respect to the ratio thereof to the polymeric binder and to the absolute concentration thereof per unit area.

Since other substitutions and changes may be made in the above products and processes without departing from the scope of the disclosed invention, it is intended that all matter contained in the foregoing description shall be interpreted as illustrative and not in a limiting sense.

What is claimed is:

1. A dichroic light polarizer comprising a sheet of molecularly oriented, transparent linear polymer having incorporated therein an oligomeric metal chelate stain having a repeating structural formula selected from

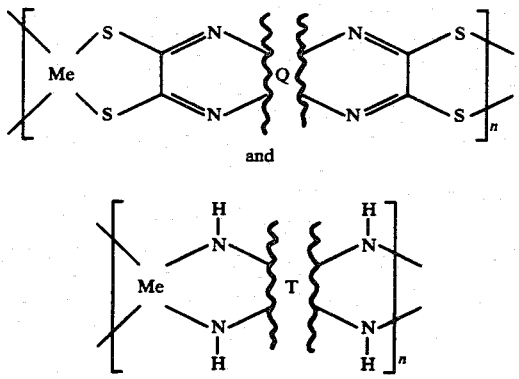

wherein Me is a metal of the first, second or third transition metal series, and may be the same or different for separate repeating units of the oligomeric stain, Q and T are bridging groups allowing said units to metal chelate at both ends, each Q and T being independently selected from the group consisting of homocyclic aromatic rings, heterocyclic aromatic rings, fused rings, rigidly connected rings and rigidly connected fused rings and n is a whole number between 2–10, inclusive.

2. The dichroic light polarizer of claim 1 wherein Q and T are independently selected from the group consisting of 3. The dichroic light polarizer of claim 1 wherein said linear polymer is polyvinyl alcohol.

4. The dichroic light polarizer of claim 1 wherein said Me is nickel.

5. The dichroic light polarizer of claim 1 wherein said Me represents nickel and manganese, respectively in separate respective repeating units of the oligomeric stain.

6. A dichroic light polarizer comprising a sheet of molecularly oriented, transparent polyvinyl alcohol having incorporated therein an oligomeric metal chelate stain comprising repeating units of the formula

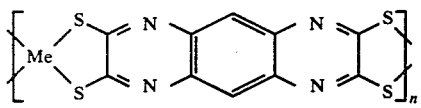

wherein Me is a metal of the first, second or third transition metal series, and may be the same or different for separate repeating units of the oligomeric stain and n is a whole number between 2–10, inclusive.

7. The dichroic light polarizer of claim 6 wherein said Me is nickel.

8. The dichroic light polarizer of claim 6 wherein said Me is manganese.

9. The dichroic light polarizer of claim 6 wherein said Me represents nickel and manganese, respectively, in separate respective repeating units of the oligomeric stain.

10. A dichroic light polarizer comprising a sheet of molecularly oriented, transparent polyvinyl alcohol having incorporated therein an oligomeric metal chelate stain comprising repeating units of the formula

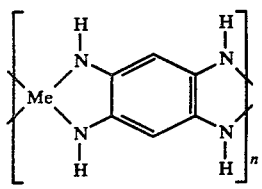

wherein Me is a metal of the first, second or third transition metal series, and may be the same or different for separate repeating units of the oligomeric stain and n is a whole number between 2–10, inclusive.

11. The dichroic light polarizer of claim 10 wherein and Me is nickel.

12. The dichroic light polarizer of claim 10 wherein said Me is manganese.

13. The dichroic light polarizer of claim 10 wherein said Me represents nickel and manganese, respectively, in separate respective repeating units of the oligomeric stain.

14. The process of preparing a dichroic light polarizer which comprises the steps of: (a) mixing together solutions containing a transparent, linear polymer and the metal and ligand components of an oligomeric dichroic metal chelate having a repeating structural formula selected from

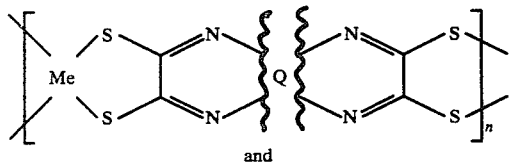

and

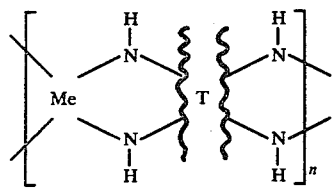

wherein Me is a metal of the first, second or third transition metal series, and may be the same or different for separate repeating units of the same oligomeric stain, Q and T are bridging groups allowing said units to metal chelate at both ends, each Q and T being independently selected from the group consisting of homocyclic aromatic rings, heterocyclic aromatic rings, fused rings, rigidly connected rings and rigidly connected fused rings and n is a whole number between 2–10 inclusive; (b) casting said mixed solutions to produce a sheet; and (c) unidirectionally stretching said cast sheet to orient the molecules of said linear polymer and said oligomeric metal chelate.

15. The process of preparing a dichroic light polarizer which comprises the steps of: (a) mixing together solutions containing a transparent, linear polymer comprising polyvinyl alcohol and the metal and ligand components of an oligomeric metal chelate stain comprising repeating units of the formula

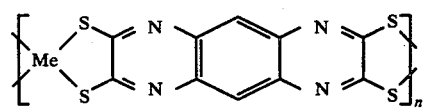

wherein Me is a metal of the first, second or third transition metal series, and may be the same or different for separate repeating units of the same oligomeric stain, and n is a whole number between 2–10 inclusive; (b) casting said mixed solutions to produce a sheet; and (c) unidirectionally stretching said cast sheet to orient the molecules of said linear polymer and said oligomeric metal chelate.

16. The process of claim 15 wherein said Me is nickel.

17. The process of claim 15 wherein said Me is manganese.

18. The process of claim 15 wherein said Me represents nickel and manganese, respectively, in separate respective repeating units of the oligomeric stain.

19. The process of claim 14 wherein said T is selected from the group

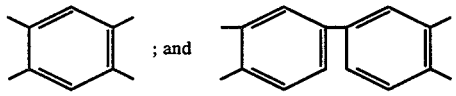

20. The process of preparing a dichroic light polarizer which comprises the steps of: (a) casting a sheet of transparent, linear polymer; (b) staining said cast sheet with an oligomeric dichroic metal chelate having a repeating structural formula selected from

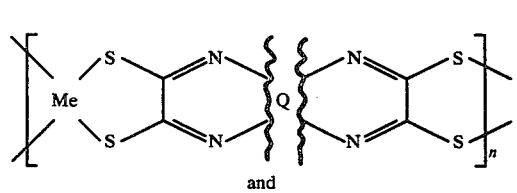

and

-continued

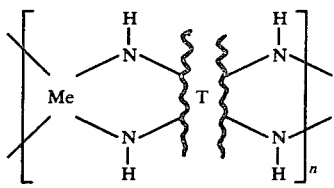

wherein Me is a metal of the first, second or third transition metal series, and may be the same or different for separate repeating units of the same oligomeric stain, Q and T are arrays allowing the molecule to metal chelate at both ends, each Q and T being independently selected from the group consisting of homocyclic aromatic rings, heterocyclic aromatic rings, fused rings, rigidly connected rings and rigidly connected fused rings and n is a whole number between 2–10 inclusive; (c) unidirectionally stretching said stained sheet to orient the molecules of said linear polymer and said oligomeric metal chelate.

21. The process of preparing a dichroic light polarizer which comprises the steps of: (a) casting a sheet of transparent, linear polymer comprising polyvinyl alcohol; (b) staining said cast sheet with an oligomeric dichroic metal chelate stain comprising repeating units of the formula

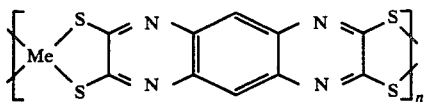

wherein Me is a metal of the first, second or third transition metal series, and may be the same or different for separate repeating units of the same oligomeric stain, and n is a whole number between 2–10 inclusive; (c) unidirectionally stretching said stained sheet to orient the molecules of said linear polymer and said oligomeric metal chelate.

22. The process of claim 20 wherein said Me is nickel.

23. The process of claim 20 wherein said Me is manganese.

24. The process of claim 20 wherein said Me represents nickel and manganese, respectively, in separate respective repeating units of the oligomeric stain.

25. The process of preparing a dichroic light polarizer which comprises the steps of: (a) casting sheets of a transparent, linear polymer; (b) unidirectionally stretching said cast sheets to orient the molecules of said linear polymer; and (c) staining said oriented sheet with an oligomeric dichroic metal chelate having a repeating structural formula selected from

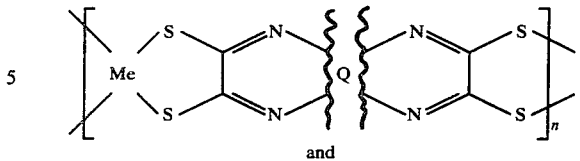

and

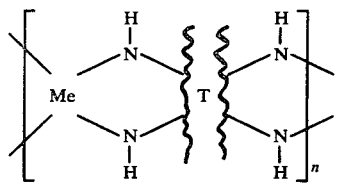

wherein Me is a metal of the first, second or third transition metal series, and may be different for separate repeating units of the same oligomeric chain, Q and T are bridging groups allowing said units to metal chelate at both ends, each Q and T being independently selected from the group consisting of homocyclic aromatic rings, heterocyclic aromatic rings, fused rings, rigidly connected rings and rigidly connected fused rings and n is a whole number between 2–10 inclusive.

26. The process of preparing a dichroic light polarizer which comprises the steps of: (a) casting sheets of a transparent, linear polymer comprising polyvinyl alcohol (b) unidirectionally stretching said cast sheets to orient the molecules of said linear polymer; and (c) staining said oriented sheet with an oligomeric dichroic metal chelate stain comprising repeating units of the formula

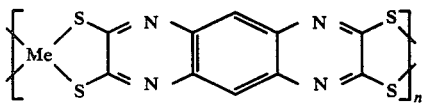

wherein Me is a metal of the first, second or third transition metal series, and may be different for separate repeating units of the same oligomeric chain and n is a whole number between 2–10 inclusive.

27. The process of claim 25 wherein said Me is nickel.

28. The process of claim 25 wherein said Me is manganese.

29. The process of claim 25 wherein said Me represents nickel and manganese, respectively, in separate respective repeating units of the oligomeric stain.

30. The process of claim 25 wherein said Q is selected from the group consisting of phenyl, biphenyl, diphenyl ether, and benzophenone and T is selected from the group consisting of phenyl, biphenyl and dipyrazinobenzene.

* * * * *